United States Patent
Eun et al.

(10) Patent No.: US 10,555,049 B2
(45) Date of Patent: Feb. 4, 2020

(54) MUSIC SHARING AND ADVERTISING (71) Applicant: KT Corporation, Seongnam-si, Gyeonggi-do (KR)

(72) Inventors: Seung-woo Eun, Seoul (KR); Myeong-jong Kim, Seoul (KR); Hyun-Bin Kim, Goyang-si (KR); Hyo-young Jung, Guri-si (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 14/734,239

(22) Filed: Jun. 9, 2015

(65) Prior Publication Data
US 2015/0358691 A1    Dec. 10, 2015

(30) Foreign Application Priority Data
Jun. 9, 2014    (KR) ........................ 10-2014-0069516

(51) Int. Cl.
| | |
|---|---|
| *H04N 21/81* | (2011.01) |
| *H04N 21/472* | (2011.01) |
| *H04N 21/236* | (2011.01) |
| *H04N 21/658* | (2011.01) |
| *H04N 21/858* | (2011.01) |
| *H04N 21/8355* | (2011.01) |
| *H04N 21/431* | (2011.01) |
| *H04N 21/8352* | (2011.01) |
| *H04N 21/482* | (2011.01) |

(52) U.S. Cl.
CPC ... *H04N 21/8113* (2013.01); *H04N 21/23614* (2013.01); *H04N 21/4316* (2013.01); *H04N 21/47202* (2013.01); *H04N 21/4828* (2013.01); *H04N 21/6581* (2013.01); *H04N 21/812* (2013.01); *H04N 21/8352* (2013.01); *H04N 21/8355* (2013.01); *H04N 21/8586* (2013.01)

(58) Field of Classification Search
CPC ............ H04N 21/4532; H04N 21/454; H04N 21/4542; H04N 7/163
See application file for complete search history.

(56) References Cited

U.S. PATENT DOCUMENTS 6,061,719 A * 5/2000 Bendinelli ............. H04N 7/088
                                              348/E5.112
8,973,037 B2 * 3/2015 Asam ................ H04N 21/42224
                                              725/39
(Continued)

FOREIGN PATENT DOCUMENTS

| KR | 10-2000-0058975 A | 10/2000 |
|---|---|---|
| KR | 10-2001-0096297 A | 11/2001 |

(Continued)

*Primary Examiner* — Nasser M Goodarzi
*Assistant Examiner* — Adil Ocak
(74) *Attorney, Agent, or Firm* — Hamre, Schumann, Mueller & Larson, P.C.

(57) ABSTRACT

In one example embodiment, a server includes a content producer configured to produce music sharing content including an advertisement and music inserted into a video file; an access address producer configured to produce an access address to provide access to the music sharing content; an access request receiver configured to receive, from a client device, an access request; and a content transmitter configured to transmit the music sharing content to the client device.

16 Claims, 5 Drawing Sheets

(56) References Cited

U.S. PATENT DOCUMENTS

| | | | | |
|---|---|---|---|---|
| 2004/0117831 A1* | 6/2004 | Ellis | ............ | H04N 5/44543 |
| | | | | 725/53 |
| 2008/0276286 A1* | 11/2008 | Robinson | ............ | G06Q 30/06 |
| | | | | 725/60 |
| 2011/0099641 A1* | 4/2011 | Malik | ............ | G06Q 30/06 |
| | | | | 726/27 |
| 2012/0253937 A1* | 10/2012 | Wing | ............ | G06Q 30/02 |
| | | | | 705/14.58 |
| 2014/0223099 A1* | 8/2014 | Kidron | ............ | G06F 12/0806 |
| | | | | 711/118 |
| 2018/0285932 A1* | 10/2018 | Andrianakou | ..... | G06Q 30/0269 |

FOREIGN PATENT DOCUMENTS

| | | |
|---|---|---|
| KR | 10-0628077 B1 | 9/2006 |
| KR | 10-2012-0117125 A | 10/2012 |
| KR | 10-2014-0117238 A | 10/2014 |

* cited by examiner

FIG. 3

EXAMPLES FOR INFORMATION OF AN ACCESS ADDRESS: URL, AN ARS NUMBER, A MO NUMBER, AND A SPECIAL SERVICE CODE FOR SEARCH • • •

MUSIC SHARING AND ADVERTISING

TECHNICAL FIELD

The embodiments described herein pertain generally to inserting music and advertisements into a visual medium.

BACKGROUND

Known music sharing services produce and distribute a uniform resource locator (URL) corresponding to a service access address as an access object; and thus provides music to user terminals that access the URL. The information accessed by activating the URL may include music identifying information and the number of times a particular song has been played or accessed.

A music sharing service provides user terminals with a music steaming service according to a volume-based pricing system. When a user terminal accesses a music server through the aforementioned URL, the identified music may be limited in the number of plays or accesses permitted. The user terminal it is able to play the received music through a web player application. The music URL may be transmitted by email, text, social media applications, etc. The user terminal that accesses the music URL may be any type of a terminal capable of downloading and executing a dedicated player application, such as a smart phone, a tablet PC or others. The music URL may be distributed to multiple users, some of whom may be commonly limited with regard to the number of plays or accesses permitted.

SUMMARY

In accordance with at least one embodiment, a server includes a content producer to produce music sharing content that includes an advertisement and music inserted into a video file, an access address producer to produce an access address to provide access to the music sharing content, an access request receiver to receive an access request from a client device, and a content transmitter to transmit the music sharing content to the client device.

In accordance with at least one other embodiment, a client device includes a user interface to receive a selection of at least one of videos, music or advertisements; a content production requester to transmit a request with the selection to produce music sharing content to a server; and an access address receiver to receive an access address to access to the produced music sharing content from the server.

In accordance with at least one more embodiment, a method includes producing music sharing content that includes music and an advertisement inserted into a video file, producing an access address to provide access to the produced music sharing content, receiving an access request based on the access address being displayed on a display device when the video is played from a client device, and transmitting, to the client device, the music sharing content corresponding to the access request.

BRIEF DESCRIPTION OF THE DRAWINGS

Since the following drawings as accompanied by this document provide preferred example embodiments of the present disclosure and are intended to facilitate understanding of the technical concept of the present disclosure together with the detailed descriptions of the present disclosure, which will be provided later, the present disclosure should not be construed as being limited to the descriptions in the drawings.

DETAILED DESCRIPTION

Hereinafter, example embodiments will be described in detail with reference to the accompanying drawings. Prior to the description, terms used throughout this document and the claims should not be construed as being limited to their ordinary meanings or meanings defined in a dictionary, and should be construed as having meanings or concepts in compliance with the technical idea of the present disclosure based on the principle that an inventor may properly define a meaning of a term to describe his/her invention in the best way.

Accordingly, configurations illustrated in the example embodiments described in this document and depicted in the drawings do not fully represent the full scope of the technical concept of the present disclosure, and it should be understood that there could be various equivalents and modifications that can replace the example embodiments at the time of filing of the present disclosure.

Figure 1:
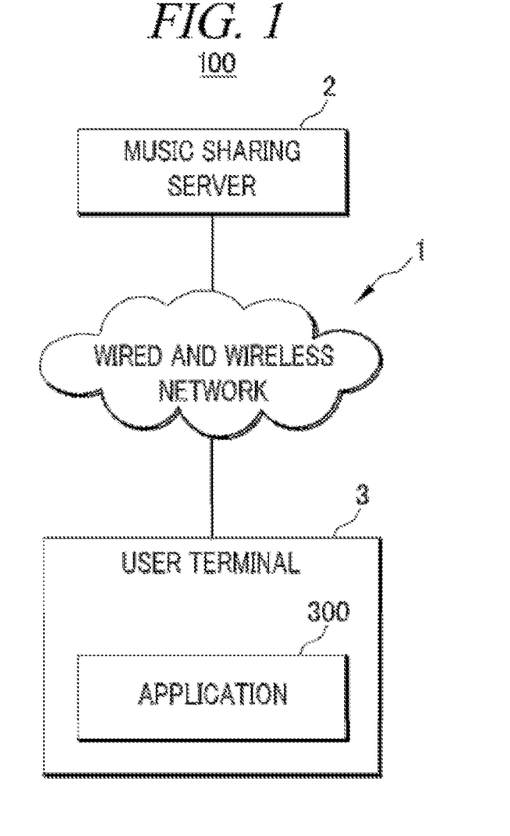
FIG. 1 shows a schematic configuration diagram of a music sharing system in accordance with at least some of the example embodiments described herein.

FIG. 1 shows a schematic configuration diagram of a music sharing system in accordance with at least some of the example embodiments described herein.

The music sharing system 100 in accordance with the example embodiments includes a music sharing server 2 that is communicatively connected to a wired or wireless network 1 and provides music sharing content that includes an advertisement and music inserted in a visual medium, e.g., a video file or a distribution channel; and a user terminal 3 that receives shared music content from the music sharing server 2 to play the music and display the advertisement.

In some example embodiments, wired or wireless network 1 includes any communication network that is capable of facilitating Internet communication by using at least one of various protocols, such as a wired or wireless public network or dedicated network, e.g., a mobile communication network or Internet.

Music sharing server 2 corresponds to an apparatus that is capable of providing an advertisement and music inserted into a visual medium, e.g., a video file or a distribution channel, provides a music sharing service that produces shared content containing the music and advertisement, and transmits the produced contents to user terminal 3.

The music sharing system 100 allows music sharing server 2 to produce music content to be shared that includes an advertisement and music inserted into a visual medium, e.g., a video file or a distribution channel. The music content to be shared is an execution object for a web service, in which a music playing service is uniquely defined. The visual medium includes a TV program, a movie, and a video, etc., and is not specifically limited. The music inserted into a visual medium refers to music played through a visual medium, such as background music, effect music, and a song sung by a main character in a visual medium. The advertisement is not limited with respect to data format, contents, display methods. For example, information (e.g., a singer and a producer) relevant to music inserted into a visual medium, e.g., video file or distribution channel, in accordance with one or more embodiments, may be accompanied by an advertisement or by product information that is unrelated to the music. Of course, the advertisement may be multimedia format.

Music sharing server 2 produces the shared music content for the music sharing service, and then distributes information regarding an access address (e.g., URL) that uniquely corresponds to the produced contents by inserting the information into a visual medium, such as a video file. Music sharing server 2 identifies the access address and provides the corresponding music content to be shared to embodiments of user terminal 3 that attempt access through the distributed access address information.

The access address information is distributed to users through subtitles of a visual medium, e.g., video file or distribution channel that may be played on respective embodiments of user terminal 3. For the access address information, information regarding the access address, including the access address itself, may be provided in subtitles. The subtitle may even include hyperlinks or QR (Quick Response) codes through which a user can access the shared music content. Typically, but not exclusively, the subtitles, which may or may not include a hyperlink, may appear at the time that the subject music is heard as the video file is played.

User terminal 3 is a communication and processing terminal in which application 300 may be hosted and executed. For example, user terminal 3 capable of hosting and executing application 300 may be a smart phone, a computer terminal, an IPTV, a smart TV or other configuration of a client device. Through execution of the application 300, user terminal 3 may access music sharing server 2; and then the user terminal 3 designs the music content to be shared, into which music and an advertisement are inserted, to request production thereof and receives an access address or music sharing contents according to an access method defined in access address information. The application 300 displays the received shared music content on a screen to play the music and play the advertisement.

A player application to play the shared music content may be plugged in the shared music content. Alternatively, application 300 may execute a player application provided in the user terminal 3 to play the music. The player plays music data streamed from the music sharing server 2 through the shared music content under control of the application 300. Of course, the application 300 may output an advertisement the music plays through at least one of an audio and video output method.

For example, in case of IPTV viewing, the comments "If you want to listen to the music being currently broadcast, you could press the red button on the remote control" may be advertised in subtitles of a lower part of a screen playing music during broadcasting of the TV program. A user presses the red button of the remote control, inputs his/her mobile number into the displayed screen to request the music, and receives a message for URL information of music sharing contents providing a play service of the music. When the user clicks the URL link in the received message, the application 300 or the web browser of the user terminal 3 is executed, and the music sharing contents are received and displayed on a screen. Of course, the contents of the comments above may be information for access to music sharing contents, like URL, an ARS (Automatic Response Service) number, a MO (Mobile Originated) number, a special service code, a QR (Quick Response) code and others.

Figure 2:
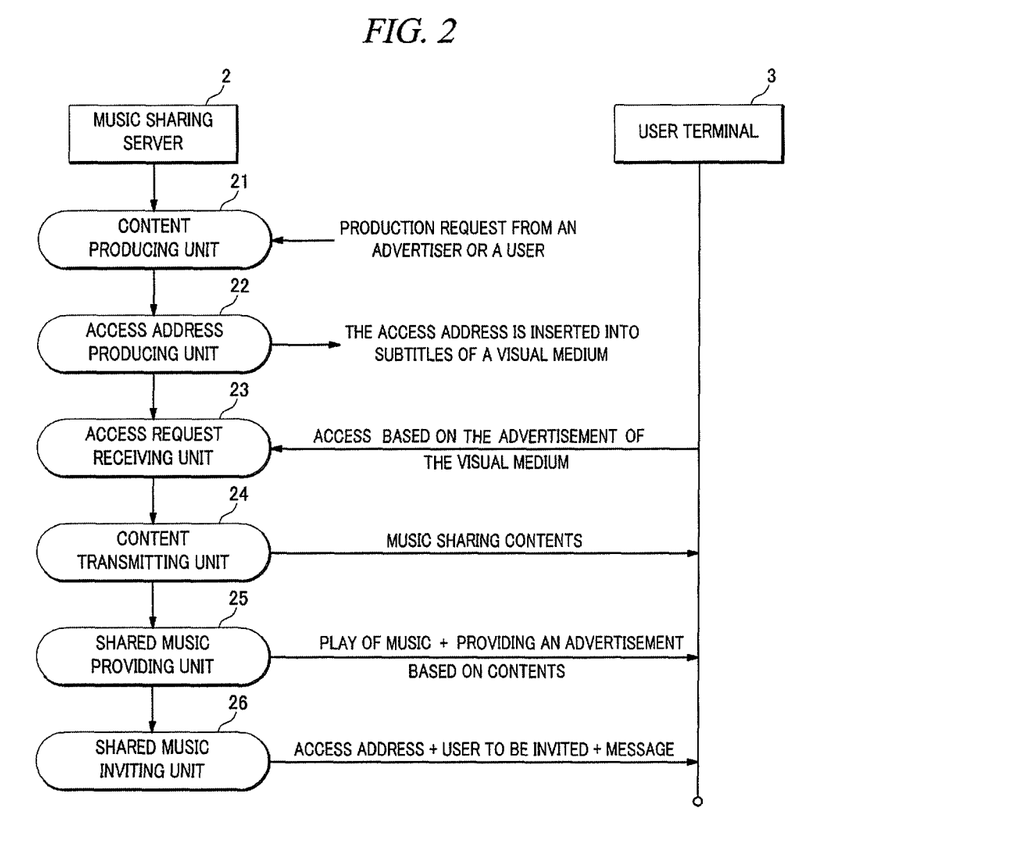
FIG. 2 shows an example block diagram of a music sharing server in accordance with at least some of the example embodiments described herein.

FIG. 2 shows an example block diagram of a music sharing server in accordance with at least some of the example embodiments described herein.

Music sharing server 2 may include content producing unit 21 that produces music content to be shared that includes an advertisement and music in a visual medium, e.g., a video file or a distribution channel, access address producing unit 22 that produces an access address for the shared music content, an access request receiving unit 23 that receives an access request for the shared music content by using the access address information, a content transmitting unit 24 that transmits the shared music content in response to the requested access address, and a shared music providing unit 25 that provides music and an advertisement through the transmitted content. Content producing unit 21 produces music sharing contents containing music in a visual medium, e.g., a video file or a distribution channel, and an advertisement based on a music sharing service.

Here, the user terminal 3 may request to produce the music sharing contents, the user terminal 3 selects a visual medium, music of a visual medium, an advertisement of music and others, and selects a design layout for contents to request production of the contents.

In order to support the content design, content producing unit 21 may provide the user terminal 3 with a list of visual mediums, e.g., video files or a distribution channel; a list of music in the respective visual mediums; a list of advertisements recommended for the respective music on the list; a layout template for the shared music content. Accordingly, the content producing unit 21 may produce user-customized shared music content based on a design received from the user. In addition, the number of authorized plays of selected music may be manually or automatically set, permission for distribution of the shared music content with other users may be manually or automatically set; and the music may be permitted to be played within the set number of play times, and the contents may be distributed to other users if the distribution is permitted. If content that not subjection to permit is distributed is produced, only individuals designated by a user are entitled to access the contents.

Content producing unit 21 may produce music sharing content that includes a function to identify content through an access address accessed by the user terminal 3, a function to provide the user terminal 3 with the identified contents, and a function to provide the user terminal 3 with a play service and a distribution service for the music, via the shared content.

Access address producing unit 22 produces a unique access address (URL) to enable access to the shared music content. The shared music content may be identified and accessed only through the access address (URL). To distribute the access address, the access address may be produced in various formats, e.g., a banner advertisement, a QR code, ARS and a MO message, distributed via the corresponding visual medium, in which the music plays. For example, access address information produced in various forms may be inserted into and advertised in subtitles of a corresponding visual medium, such as a distribution channel. Of course, the access address information of the contents includes an access address or procedural guidance to obtain the access address, and is not specifically limited with respect to a format or contents as long as a user can understand the contents of the access address information through a visual medium.

Access request receiving unit 23 receives an access request from the application 300 of the user terminal 3 that is attempting to access shared music content by using the access address information advertised and distributed through the visual medium. The access request for the access address may be made using application 300, and the access request receiving unit 23 receives the access request.

Content transmitting unit 24 identifies the shared music content for the received access address, and transmits the identified content to the application 300. The application 300 displays the received content on a screen of the respective device.

The shared music providing unit 25 provides an advertisement inserted into shared music content and a music playing service in response to a request received from a user. Shared music providing unit 25 receives a request for play of music from at least one of the user terminal 3 sharing identical music sharing contents, and provides a play service for the music within a residual limit of the number of play times. Specifically, the shared music providing unit 25 may determine that a user has effectively received music once certain time lapses after the music has played, and reduce the number of play times by one.

Music sharing server 2 may further include a shared music inviting unit 26. The shared music inviting unit 26 receives an invitation request to permit a new user to play the corresponding content from the application 300. In addition, the shared music inviting unit 26 further receives registration of a receiving address by, e.g., text (e.g., SMS or applications) or social media application, of the user to be invited and the invitation. Then, the shared music inviting unit 26 transmits an invitation message including the access address of the content to be shared to the corresponding receiving address.

Figure 3:
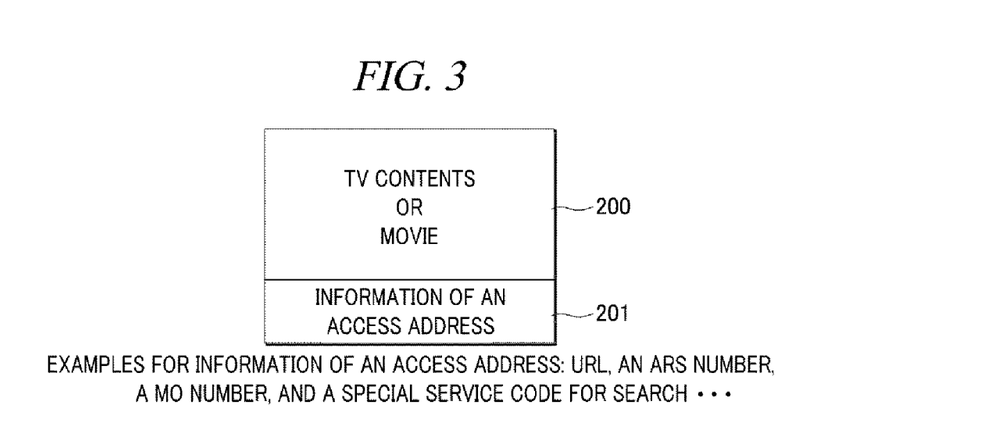
FIG. 3 shows an example of an access address produced by the music sharing server in accordance with at least some of the example embodiments described herein.

FIG. 3 shows an example of an access address produced by the music sharing server in accordance with at least some of the example embodiments described herein.

In case of a visual medium 200 like a TV program or a movie, information of an access address is advertised through subtitles 201 in a scene relevant to particular music. Information of an access address may be URL, a MO number, an ARS number, a special service code for search of contents, a QR code or others, and includes information of procedure guidance that allows a user to obtain an access address. That is, information of an access address includes information that displays, includes, or acquires an access address. When a user identifies access address information in a scene, in which music appears, through a visual medium, the user acquires the access address according to the procedure guided in the access address information, and accesses contents according to the acquired access address.

Figure 4:
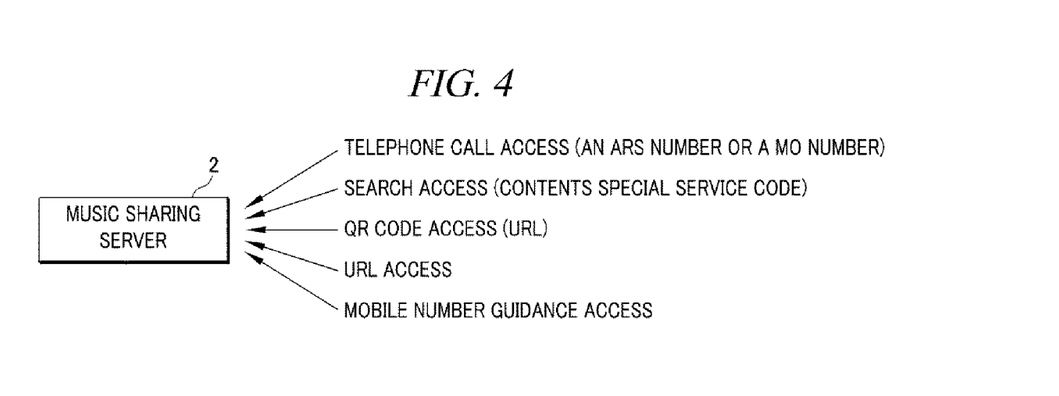
FIG. 4 shows a schematic diagram showing how a music sharing server may process an access request from a user terminal in accordance with at least some of the example embodiments described herein.

FIG. 4 shows a schematic diagram showing how a music sharing server may process an access request from a user terminal in accordance with at least some of the example embodiments described herein.

Access request receiving unit 2 receives an access request from the user terminal 3 that utilizes access address information inserted in a displayed subtitle advertisement.

When the user terminal 3 attempts access by using an ARS number or a message number provided in subtitle advertisement according to a telephone call access method, the access request receiving unit 2 may provide a message containing URL of an access address in response. When the user clicks the URL of the message received by the user terminal 3, the access request receiving unit 2 receives the access request from the user.

Alternatively, when a user inputs an special service code provided in subtitle advertisement in the application 300 to request search of music sharing content, and requests access by using URL of an access address received as a result of the search, the access request receiving unit 2 receives the access request of the application 300.

Alternatively, when the user terminal 3 acquires a QR code provided in the subtitle advertisement and clicks URL included in the QR code, the access request receiving unit 2 receives the access request by execution of the application 300.

Alternatively, the user terminal 3 may transmit an access request when a URL is input or clicked on the application 300 or the browser, and the access request receiving unit 23 receives the access request. For example, if the user terminal 3 is an IP TV or smart TV terminal, when a user clicks URL included in the subtitle advertisement, the web browser equipped in the TV may transmit an access request, and the access request receiving unit 23 receives the access request.

If an IP TV or smart TV guides input of a mobile number of a user through an advertisement in a displayed subtitle, and the user inputs a mobile number using a TV remote control via an input window, the access request receiving unit 2 receives the input mobile number and transmits a message including URL of an access address to the mobile terminal. When the user checks the message transmitted to the mobile terminal and clicks the URL, the application 300 or the web browser is executed to transmit an access request, and the access request receiving unit 23 receives the access request.

Figure 5:
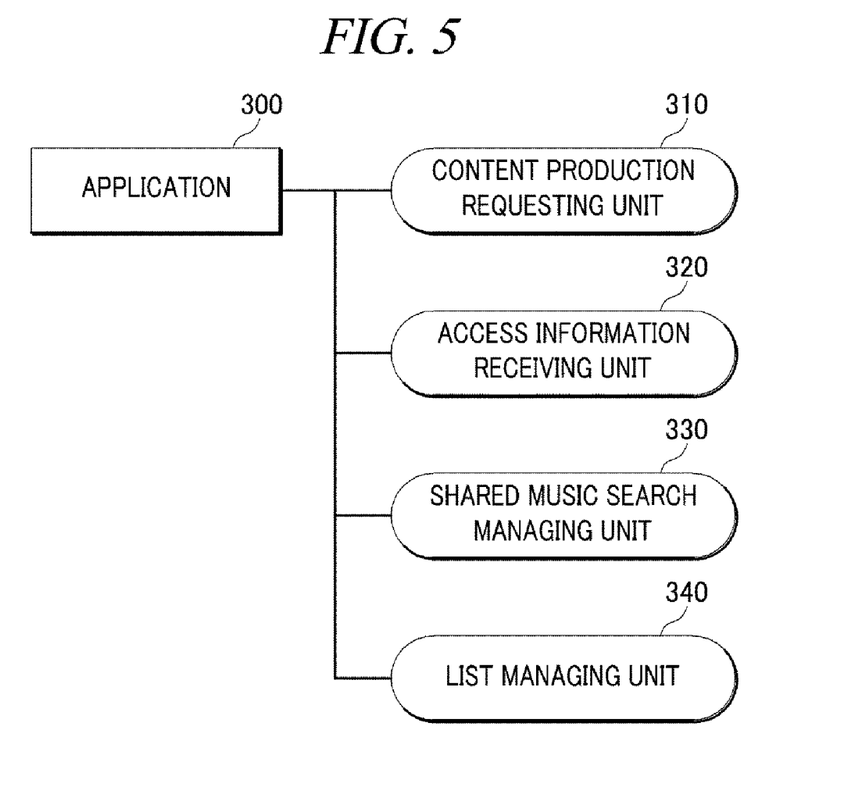
FIG. 5 shows a schematic diagram of a music sharing application in accordance with at least some of the example embodiments described herein.

FIG. 5 shows a schematic diagram of a music sharing application in accordance with at least some of the example embodiments described herein.

Application 300 may include a content production requesting unit 310 that receives selection of a music file and an advertisement, and requests production of music content to be shared. Application 300 may also include an access information receiving unit 320 that receives access information of the content that is requested to be produced.

Content production requesting unit 310 displays a list of music inserted into a visual medium received from the music sharing server 2 on a screen, and receives selection of a specific sound source and advertisement from a user. An advertisement may be predesignated for a certain sound source so as not to permit user's selection of an advertisement.

Content production requesting unit 310 receives input of a limit of the number of authorized plays or play points, and a permission of invitation of a new user with respect to the music sharing content, and transmits a request for production of the content. If an invitation is selected, the corresponding contents can be shared; but if an invitation is not permitted, only a person designated by the user is entitled to play the corresponding content. Accordingly, music sharing server 2 produces contents and an access address, which are customized to meet the user's request.

Content production requesting unit 310 may receive, from a user, various settings for when an advertisement is to be displayed as well as a layout for such display. For example, according to the setting of a layout, when a user requests that music be played in the content to be shared, an advertisement may be set to be displayed when the music is played.

In response to the user's request for production of contents, access information receiving unit 320 receives access information for the shared music content requested to be produced, from the music sharing server 2.

Application 300 provides a streaming service that downloads the music requested by the user to be played from the music sharing server 2 and plays the music, through a player equipped in the application 300 or a player plugged in the contents.

In addition, the application 300 may further include a shared music search managing unit 330 and a list managing unit 330.

When receiving the music sharing contents from the music sharing server 2, the shared music search managing unit 330 may display, on a screen, an access address, a limit of the number of play times or points, an advertisement, and whether to finish sharing with regard to the shared music according to a user's request for search.

When initially receiving the corresponding music sharing contents from the music sharing server by using an access address, the list managing unit 330 adds the access address to a content list. Then, the user selects specific contents from the content list and requests access to an access address, and the application 300 receives the contents requested for access and displays the contents on the screen.

Figure 6:
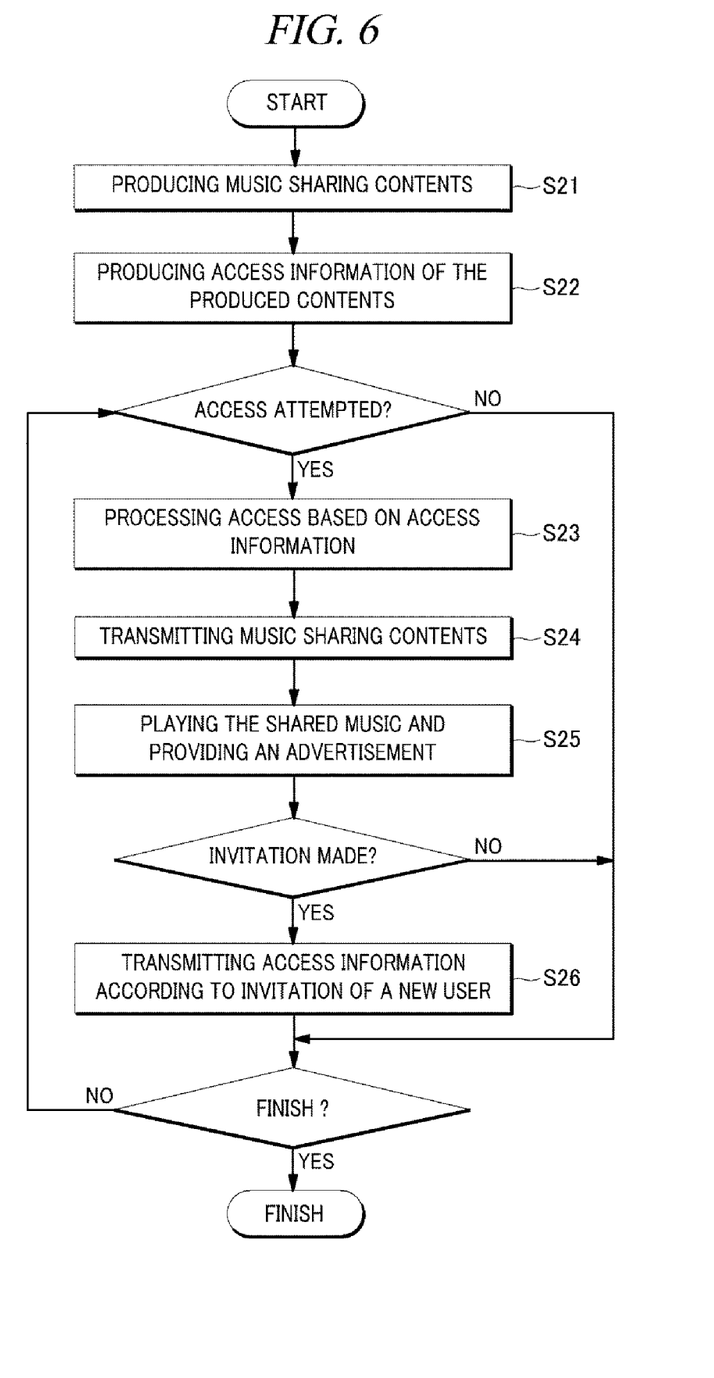
FIG. 6 shows a processing flow for providing music and an advertisement into a visual medium in accordance with at least some of the example embodiments described herein.

FIG. 6 shows a processing flow for providing music and an advertisement into a visual medium in accordance with at least some of the example embodiments described herein.

Hereinafter, a terminal of a user producing contents may be referred to as a first user terminal 3, and a terminal of a user providing a play service of contents may be referred to as a second user terminal 3. The first and second users may be the same.

First user terminal 3 accesses the music sharing server 2 to select music corresponding to visual media and an advertisement; and requests production of music content to be shared. Here, the user may select music and an advertisement by searching a list of music associated with TV programs, movies, and videos. In addition, when requesting production of the content, first user terminal 3 may transmit information regarding a permissible number of plays for the content, information regarding invitation of other users, a design for the display of the content.

When receiving the request for production of content from first user terminal 3, music sharing server 2 produces music content to be shared that also provides a service to play the music and an advertisement, and also stores the content in DB (S21).

When the content are produced, music sharing server 2 produces a unique access address, through which the music sharing contents is uniquely identified and accessed; and music sharing server 2 provides the access address to first user terminal 3. Music sharing server 2 may provide access address information such as an ARS number, a MO message number, a QR code and a special service code, through which the access address can be referred to, in response to the first user's request. Thereafter, the first user terminal 3 prepares comments including use procedures for guiding a user to access the contents by using the received access address information, and requests advertising to a media company. Then, the comments of the produced access address information are inserted in the form of subtitles into a corresponding visual medium to be advertised to the public. That is, the visual medium is used to distribute the access address.

Thereafter, second user terminal 3 refers to the access address information on the screen associated with the music through the visual medium. According to the contents use procedures guided for the second user in the visual medium, second user terminal 3 accesses the contents of the music sharing server 2 through the access address or the access address information.

When second user terminal 3 makes an access request, the music sharing server 2 receives the access request from the second user terminal 3 (S23).

Here, the second user terminal 3 may request access to the contents based on URL corresponding to an access address of the contents through the various access methods illustrated in FIG. 4, e.g., the telephone call access method that receives URL of an access address by using an ARS number or a message number inserted in the form of subtitles into a visual medium.

When the access request from the second user is received, music sharing server 2 transmits the music content to be shared that uniquely corresponds to the access address to the accessed second user terminal 3 (S24). Then, the application 300 receives the content and display the content. When the shared music content is initially received, application 300 stores the access address in a content list. In addition, upon a request from the second user, application 300 may receive, from music sharing server 2, an access address, a limit of the number of play times or points, an advertisement and whether to finish sharing with regard to the shared music and display them. Second user terminal 3 may submit a request to play the music through application 300. Application 300 may accept the request for play of the music within a residual limit of the number of play times and points.

When second user terminal 3 transmits a request to play the music, music sharing server 2 provides second user terminal 3 with a streaming service for the music through the contents (S25). In addition, music sharing server 2 may provide second user terminal 3 with an advertisement corresponding to the music being played. Of course, an advertisement may be provided in S24 through the music sharing contents, regardless of the play of the music.

When the play of the music starts, music sharing server 2 reduces the limit of the number of play times and points of the music by one.

When the second user terminal 3 transmits an invitation to a third party on the content display screen of the application 300, music sharing server 2 receives information (e.g., a mobile number and a SNS address) of the invited user from application 300, and transmits an invitation message including URL of an access address to the address of the received user information (S26).

In the above-described example embodiments, the term "unit" has not been used to mean hardware classification of the music sharing server 2. Accordingly, a multiple number of component units may be integrated to be one component unit, and one component unit may be divided into a multiple number of component units. In addition, a component unit may refer to a component unit of not only hardware but also software. Accordingly, it should be understood that the example embodiments are not specifically limited by the term "unit."

The example embodiments have been described with reference to specific examples and drawings, but are not limited to the examples and drawings. One of ordinary skill in the art may make various modifications and changes to the example embodiments within a scope equivalent to the technical idea of the example embodiments and the following claims.

We claim:

1. A server, comprising:
   a content producer configured to:
   provide a first client device with a list of music contained in a video medium, and
   receive, from the first client device, a selection of at least one of a sound source of the music and at least one advertisement to be included in music sharing content, wherein the at least one advertisement corresponds to the at least one sound source and is to be played simultaneously with the music, and
   produce the music sharing content including the selected advertisement and the selected sound source of the music corresponding to at least one scene from the video content;
   an access address producer configured to produce an access address to be distributed via the video content, the access address uniquely corresponding to the produced music sharing content and providing access to the music sharing content;
   an access request receiver configured to receive, from a second client device, based on the access address displayed on the first client device and entered on the second client device, an request for access to the music sharing content; and
   a content transmitter configured to transmit the music sharing content corresponding to the access address to the second client device.

2. The server of claim 1, wherein the content producer is further configured to provide the first client device with a layout template for all of the video content.

3. The server of claim 2, wherein the content producer is further configured to:
   receive, from the first client device, a selection of at least one of the video contents and license information regarding at least one of the number of available play times of the sound source of the music or distribution permissions of the music sharing content, and
   produce the music sharing content based on the selection and the license information.

4. The server of claim 3, wherein the music sharing content counts a number of available plays for the sound source of the music.

5. The server of claim 1, wherein the access address includes at least one of an ARS number, MO message, a QR code or a unique identification for searching the music.

6. The server of claim 1, further comprising:
   a distribution manager configured to:
   receive, from the second client device, information identifying a third client device to be invited to the music sharing content, and
   transmit the access address to the third client device based on the received identifying information.

7. A first client device, comprising:
   a user interface configured to:
   display a list of music corresponding to video content, and
   receive a selection of at least one advertisement to be included in music sharing content and at least one sound source of music corresponding to at least one scene from the video content, wherein the at least one advertisement corresponds to the at least one sound source and is to be played simultaneously with the music;
   a content production requester configured to transmit, to a server, a request to produce the music sharing content with the selections of the at least one sound source of music and the selected advertisement; and
   an access address receiver configured to receive, from the server, an access address to be distributed via the video content, the access address uniquely corresponding to the produced music sharing content and providing access to the produced music sharing content on another device upon request by the another device which subsequently enters the displayed access address,
   wherein the access address is to be displayed in the video content by the user interface.

8. The first client device of claim 7, wherein the user interface is further configured to receive license information regarding at least one of the number of available plays of the sound source of the music or distribution permissions of the music sharing content, and
   the content production requester is further configured to transmit, to the server, the license information.

9. The first client device of claim 7, wherein the second client device includes:
   an access requester configured to transmit, to the server, an access request based on the access address being displayed on the display device;
   a content receiver configured to receive, from the server, the produced music sharing content; and
   a content provider configured to provide the sound source of the music and the advertisement through the music sharing content.

10. The first client device of claim 9, wherein the access address includes at least one of an ARS number, a QR code or a unique identification for searching the sound source of the music.

11. The first client device of claim 7, further comprising:
    a content manager configured to manage a content list including at least one of the sound source of the music, the access address, the number of available plays times of the sound source of the music or the advertisement.

12. A method, comprising:
    providing a first client device with a list of music contained in a video medium;
    receiving, from the first client device, a selection of at least one of a sound source of the music and at least one advertisement to be included in music sharing content, wherein the at least one advertisement corresponds to the at least one sound source and is to be played simultaneously with the music;
    producing the music sharing content including the selected advertisement and the selected sound source of the music corresponding to at least one scene from the video content;
    producing an access address to be distributed via the video content, the access address uniquely corresponding to the produced music sharing content and providing access to the produced music sharing content;
    receiving, from a second client device on which the access address is entered, an access request based on the access address being displayed on a display device when the video content is played on the first client device; and
    transmitting, to the second client device, the requested music sharing content corresponding to the access request.

13. The method of claim 12, further comprising:
    providing the first client device with a layout template;

receiving license information of at least one of the number of available plays of the sound source of the music or distribution permissions of the produced music sharing content; and producing the music sharing content based on the selection and the license information.

14. The method of claim 12, wherein the access address includes at least one of an ARS number, MO message, a QR code or a unique identification for searching for the sound source of the music.

15. The method of claim 12, wherein the music sharing content provides play service of the sound source of the music within the number of available play times of the sound source of the music while counting the number of available play times of the sound source of the music.

16. The method of claim 12, further comprising:
receiving, from the second client device, identifying information regarding a third client device to be invited to receive the music sharing content; and
transmitting the access address to the third client device based on the identifying information regarding the third client device.

\* \* \* \* \*